US 7,134,337 B2

(12) United States Patent
Willig et al.

(10) Patent No.: US 7,134,337 B2
(45) Date of Patent: Nov. 14, 2006

(54) MICROMECHANICAL ROTATIONAL RATE SENSOR

(75) Inventors: Rainer Willig, Tamm (DE); Andreas Thomae, Stuttgart (DE); Burkhard Kuhlmann, Eningen (DE); Joerg Hauer, Reutlingen (DE); Udo-Martin Gomez, Leonberg (DE); Siegbert Goetz, Gerlingen (DE); Christian Doering, Stuttgart (DE); Michael Fehrenbach, Mittelstadt (DE); Wolfram Bauer, Tuebingen (DE); Udo Bischof, Wannweil (DE); Reinhard Neul, Stuttgart (DE); Karsten Funk, Palo Alto, CA (US); Markus Lutz, Palo Alto, CA (US); Gerhard Wucher, Reutlingen (DE); Jochen Franz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/328,755

(22) Filed: Jan. 9, 2006

(65) Prior Publication Data

US 2006/0107738 A1  May 25, 2006

Related U.S. Application Data

(63) Continuation of application No. 10/473,004, filed as application No. PCT/DE02/03570 on Sep. 23, 2002, now abandoned.

(30) Foreign Application Priority Data

Jan. 30, 2002  (DE) ................. 102 03 515

(51) Int. Cl.
 *G01P 9/04* (2006.01)
(52) U.S. Cl. ................. 73/504.12; 73/504.14

(58) Field of Classification Search ............. 73/504.02, 73/504.04, 504.12, 504.14, 504.16
See application file for complete search history.

(56) References Cited

U.S. PATENT DOCUMENTS

| 5,728,936 | A | | 3/1998 | Lutz | |
| 5,911,156 | A | * | 6/1999 | Ward et al. | 73/504.16 |
| 6,122,961 | A | * | 9/2000 | Geen et al. | 73/504.12 |
| 6,240,780 | B1 | * | 6/2001 | Negoro et al. | 73/504.12 |
| 6,301,963 | B1 | * | 10/2001 | Park | 73/504.12 |
| 6,308,568 | B1 | * | 10/2001 | Moriya | 73/504.13 |
| 6,327,907 | B1 | * | 12/2001 | Park | 73/504.12 |
| 6,349,597 | B1 | * | 2/2002 | Folkmer et al. | 73/504.02 |
| 6,370,937 | B1 | * | 4/2002 | Hsu | 73/1.37 |
| 6,490,924 | B1 | * | 12/2002 | Kato et al. | 73/504.12 |
| 6,691,571 | B1 | * | 2/2004 | Willig et al. | 73/504.12 |

FOREIGN PATENT DOCUMENTS

| DE | 44 28 405 | 2/1996 |
| DE | 195 30 007 | 2/1997 |
| DE | 198 32 906 | 2/2000 |
| EP | 0775 290 | 5/1997 |
| EP | 0 990 872 | 4/2000 |
| WO | 98 15799 | 4/1998 |

OTHER PUBLICATIONS

M. Lutz, W. Golderer, J. Gerstenmeier, J. Marek, B. Maihöfer, and D. Schubert; "A Precision Yaw Rate Sensor in Silicon Micromachining"; SAE Technical Paper, 980267.

* cited by examiner

*Primary Examiner*—Daniel S. Larkin
*Assistant Examiner*—John C Hanley
(74) *Attorney, Agent, or Firm*—Kenyon & Kenyon LLP

(57) ABSTRACT

An exemplary embodiment of the present invention creates a micromechanical rotational rate sensor having a first Coriolis mass element and a second Coriolis mass element which may be situated over a surface of a substrate. An exemplary embodiment of a micromechanical rotational rate sensor may have an activating device by which the first Coriolis mass element and the second Coriolis mass element are able to have vibrations activated along a first axis. An exemplary embodiment of a micromechanical rotational rate sensor may have a detection device by which deflections of the first Coriolis mass elements and of the second Coriolis element are able to be detected along a second axis, which is perpendicular to the first axis, on the basis of a correspondingly acting Coriolis force. The first axis and second axis may run parallel to the surface of the substrate. The detecting device may have a first detection mass device and a second detection mass device. The centers of gravity of the first Coriolis mass element, the second Coriolis mass element, the first detection mass device and the second detection mass device may coincide at a common mass center of gravity when they are at rest.

15 Claims, 1 Drawing Sheet

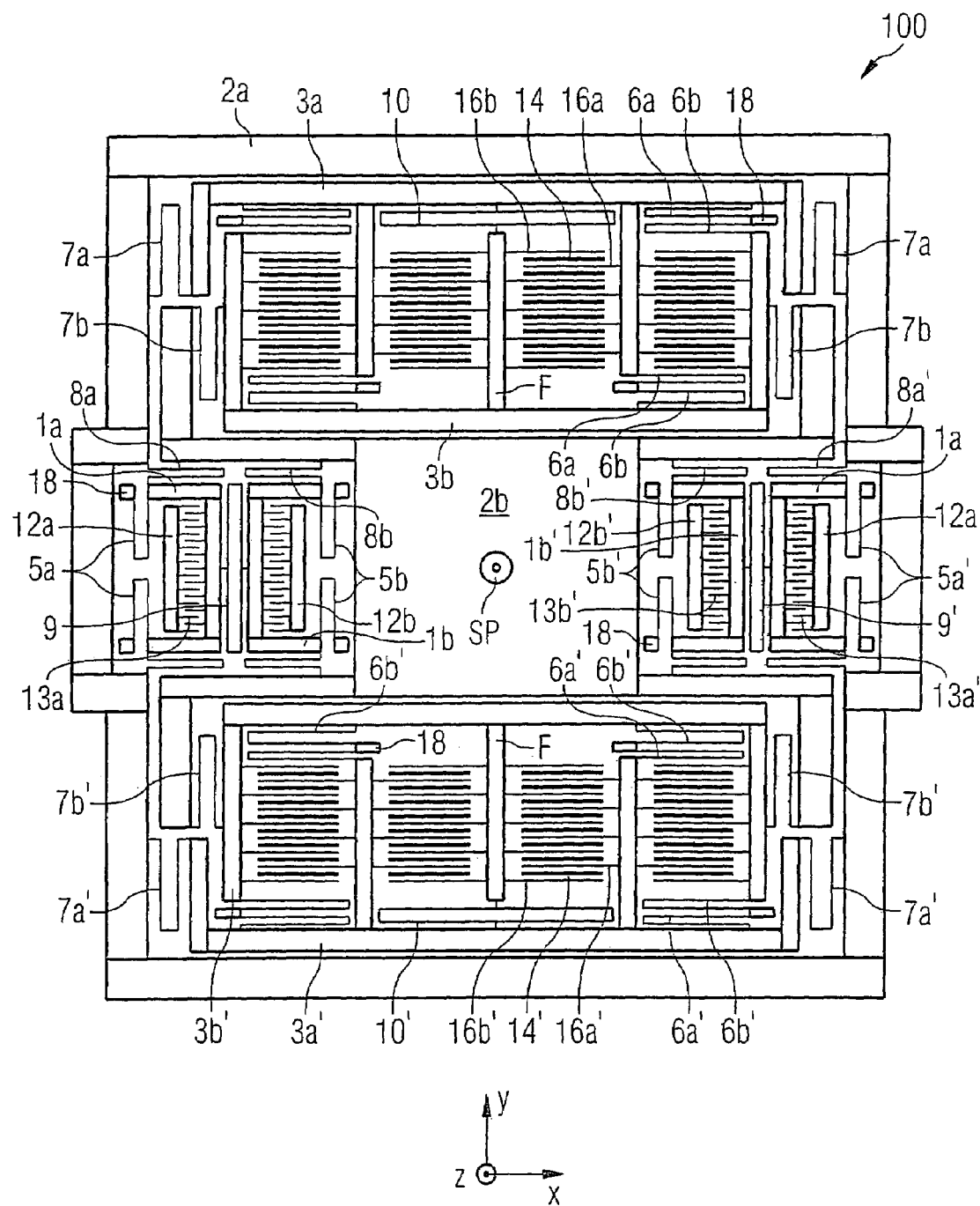

MICROMECHANICAL ROTATIONAL RATE SENSOR

CROSS-REFERENCE TO RELATED APPLICATION

This application is a continuation of prior application U.S. Ser. No. 10/473,004 filed Apr. 2, 2004, now abandoned which was a National Stage Application of PCT International Application No. PCT/DE02/03570, filed Sep. 23, 2002.

FIELD OF THE INVENTION

The present invention relates to a micromechanical rotational rate sensor.

BACKGROUND INFORMATION

Rotational rate sensors in which a first and a second Coriolis element are arranged on the surface of a substrate are discussed in U.S. Pat. No. 5,728,936. The Coriolis elements may be induced to vibrate along a first axis. The deflections of the Coriolis elements due to a Coriolis force along a second axis, which is likewise parallel to the substrate, may be verified.

German Patent No. 198 32 906 discusses a capacitive rotational rate sensor made up of a flexibly supported, mirror-symmetrically designed seismic mass, on which electrodes are fastened in a comb-like manner. At least two groups of comb-like counterelectrodes may be provided, arranged in mirror symmetry, which may be each fastened to a carrier and engage between the electrodes fastened to the seismic mass. The carriers of the counterelectrodes may be fastened only in the vicinity of the axis of symmetry at the closest point on a ceramic carrier. A frame may also be provided on which the seismic mass is fastened via two leaf springs. Two actuators may be used for the excitation of vibrations of the frame, which has integrated vibratory springs and which may be fastened on the ceramic carrier at at least two points of attachment.

European Patent No. 0 775 290 discusses a rotational rate sensor made up of at least two vibrating masses, which are connected to each other via a spring element to form a system capable of vibrating, which is supported on a substrate. Also provided are actuators for inducing vibrations, as well as at least one sensing element for the detection of the Coriolis force. The spring elements and the vibrating masses are positioned and designed in such a manner that the system capable of vibrating is only able to execute vibrations in at least two vibration modes parallel to the plane of the substrate, one mode being used as excitation mode of the vibration excitation and the second mode, possibly orthogonal to it, is excited as the detection mode upon rotation about an axis perpendicular to the substrate to the Coriolis forces.

M. Lutz, W. Golderer, J. Gerstenmeier, J. Marek, B. Maihöfer and D. Schubert, *A Precision Yaw-Rate Sensor in Silicon Micromachining;* SAE Technical Paper, 980267, and K. Funk, A. Schilp, M. Offenberg, B. Elsner, and F. Lärmer, *Surface-Micromachining of Resonant Silicon Structures,* The 8th International Conference on Solid State Sensors and Actuators, Eurosensors IX, Stockholm, Sweden, Jun. 25–29, 1995, pp. 50–52, discuss other rotational rate sensors.

One disadvantage of the known rotational rate sensors is the sensitivity of the structures with respect to interference accelerations, particularly with respect to angular accelerations about the sensitive axis, as well as with respect to the insufficient robustness of the structures.

One reason for the sensitivity with respect to interference accelerations may be particularly founded in the low working frequency of these rotational rate sensors (1.5 kHz to 6 kHz), since in this frequency range interference accelerations may occur in the motor vehicle which have non-negligible amplitudes.

A second reason may be linked to the functioning principles of rotational rate sensors. In the case of a certain sensor type, besides a (desired) external rotational speed about the sensitive axis, a measuring signal may also be triggered by a rotational acceleration about the same axis. Therefore, the known rotational rate sensors may be particularly sensitive to this kind of interference acceleration.

The low working frequencies may also be a reason for the inadequate robustness of the rotational rate sensors, particularly as regards falling protection. A further reason for the inadequate robustness may be involved with a complicated process control, for example, a combination of bulk and surface micromechanics.

SUMMARY OF THE INVENTION

An exemplary embodiment of the present invention concerns the idea that the centers of gravity of the first Coriolis mass element, the second Coriolis mass element, the first detecting mass device and the second detecting mass device, when at rest, coincide at one common mass center of gravity. If one operates a rotational rate sensor, constructed in this manner, using excitation in phase opposition which causes an opposite deflection of the first detecting mass device and the second detecting mass device under the influence of a Coriolis force, separate effects due to external linear accelerations or centrifugal accelerations may be removed, since these only bring with them a same-directed deflection of the first detecting mass device and the second detecting mass device. In addition, rotational accelerations about the sensing axis may bring about no deflection, and consequently may have no influence.

The micromechanical rotational rate sensor according to an exemplary embodiment of the present invention thus may have greatly improved sensitivity to interference and cross sensitivity, robustness and resolution range (driving dynamics range). This may be achieved by the possibility of selecting a high operating frequency and by the special symmetrical designs of the sensor mass elements.

The structure described may be designed for manufacturing in straightforward micromechanical technology, but converting the functional principles to other technologies (bulk micromechanics, LIGA, etc.) may be easily possible. The sensor element may be designed so that, with respect to a silicon substrate, which may be used at the same time as a reference coordinate system, movably suspended seismic masses may be set into vibration parallel to the substrate plane. An external rotational rate acting about the substrate normal generates a Coriolis acceleration in the moved masses perpendicularly to the direction of motion and perpendicularly to the substrate normals, i.e. also parallel to the substrate plane. Thus, what is involved here in the system described, is an in-plane/in-plane linear vibrator system.

In the case of the structure described here, at the same time, the tuning fork principle and the inverse tuning fork principle play a role. The structure described may be designed for operating frequencies >10 kHz. This may lead to a further reduction of the sensitivity to interference of the sensor elements in the situation of their use in the automobile field. Interference accelerations in particular in a vehicle may be reduced in this frequency range compared to the frequency range in use up to now, of typically 1.5 kHz to 6 kHz. The selection of the operating frequency furthermore may lead to substantially more robust sensor structures having an increased falling protection. A suspension on numerous folded spring elements may also contribute to robustness.

As the functional principle, both the tuning fork principle and the inverse tuning fork principle may be implemented here. In that exemplary embodiment, the mass centers of gravity of the individual masses at rest coincide with the mass center of gravity of the entire vibrating structure at rest. The activation and detection may possibly occur orthogonally to each other in the substrate plane, about the common mass center of gravity. The position of the mass center of gravity of the entire vibrating structure may be time-invariant with respect to the substrate in normal operation. In this functional principle, both a rotational acceleration about the Z axis may produce no measuring effect and, in response to a suitable design, centrifugal accelerations about the Z axis and linear accelerations in the sensing direction may also produce no measuring effect, as a result of which sources of interference may be able to be suppressed.

According to one exemplary embodiment, the first detecting mass device may be connected via first springs, which may be designed to be flexible along the first axis and stiff along the second axis, to the first Coriolis mass element, and, via second springs, which may be designed to be stiff along the first axis and flexible along the second axis may be connected to the substrate. At the same time, the second detecting mass device may be connected to the second Coriolis mass element via third springs, which may be designed to be flexible along the first axis and stiff along the second axis, and, via fourth springs, which may be designed to be stiff along the first axis and flexible along the second axis, may be connected to the substrate.

According to another exemplary embodiment, the activating device may have a first activating mass device and a second activating mass device, the centers of gravity of the first activating mass device and the second activating mass device may also coincide at the common mass center of gravity in a state of rest.

According to another exemplary embodiment, the first activating mass device may have a first activating mass element and a second activating mass element, and the second activating mass device may have a third activating mass element and a fourth activating mass element, which may be able to be activated individually each via a respective comb actuator.

According to another exemplary embodiment, the first and second activating mass elements may be connected to the first Coriolis mass element via fifth springs, which may be designed to be stiff along the first axis and flexible along the second axis, and, via sixth springs, which may be designed to be flexible along the first axis and stiff along the second axis may be connected to the substrate. At the same time, the third and fourth activating mass elements may be connected to the second Coriolis mass element via seventh springs, which may be designed to be stiff along the first axis and flexible along the second axis, and, via eighth springs, which may be designed to be flexible along the first axis and stiff along the second axis may be connected to the substrate.

According to another exemplary embodiment, the first Coriolis mass element may have the shape of a closed polygonal frame, possibly of a substantially square frame.

According to another exemplary embodiment, the second Coriolis mass element may be situated within the first Coriolis mass element, and may have a polygonal shape, possibly a substantially square shape.

According to another exemplary embodiment, the first Coriolis mass element and the second Coriolis mass element may be able to be activated by the activating device to vibrations in phase opposition along a first axis, and the first detecting mass device and the second detecting mass device may be able to be deflected in various directions along the second axis, on account of the acting Coriolis force.

In conformance with another exemplary embodiment, the first activating mass device may have a first detecting mass element and a second detecting mass element, and the second detecting mass device may have a third detecting mass element and a fourth detecting mass element, which each may have a plurality of fingers situated along the second axis, and movable electrodes may be provided at the fingers which may cooperate with electrodes firmly anchored to the substrate in detecting the deflections.

According to another exemplary embodiment, the first activating mass element and the third activating mass element, as well as the second activating mass element and the fourth activating mass element may be coupled to one another pairwise by a connecting spring in each case, which may be designed to be flexible along the first axis and possibly stiff along the second axis.

According to another exemplary embodiment, the first activating mass element and the third activating mass element, as well as the second activating mass element and the fourth activating mass element may be coupled to one another pairwise by a connecting spring in each case, which may be designed possibly to be stiff along the first axis and flexible along the second axis.

According to another exemplary embodiment, a mechanical coupling may be provided along the x axis and along the y axis by a coupling spring device between the Coriolis mass elements. The coupling spring device may be designed flexible along the x axis and along the y axis.

BRIEF DESCRIPTION OF THE DRAWING

FIG. 1 shows a schematic top view of an exemplary embodiment of the micromechanical rotational rate sensor according to the present invention.

DETAILED DESCRIPTION

For reasons of clarity, not all elements in FIG. 1 have been provided with reference numerals.

In FIG. 1, 1a denotes a first activating mass element, 1a' a second activating mass element, 1b a third activating mass element and 1b' a fourth activating mass element. 2a is a first Coriolis mass element and 2b is a second Coriolis mass element. 3a denotes a first detecting mass element, 3a' a second detecting mass element, 3b a third detecting mass element and 3b' a fourth detecting mass element.

As may be seen in FIG. 1, all the functional mass elements 1a, 1a', 1b, 1b', 2a, 2b, 3a, 3a', 3b, 3b' are situated symmetrically in such a manner that their center of gravity coincides at a common mass center of gravity SP, which lies at the center of the vibrating structure. All individual masses are suspended movably over substrate 100. Besides setting the common mass center of gravity, the selected symmetrical construction also assures nonsensitivity to process tolerances.

In the following, the activation of first and second Coriolis mass elements 2a, 2b is described, of which the first, 2a, has a closed frame structure and the second, 2b, has a substantially square shape having right-angled angle continuations hanging from it.

Activating mass elements 1a, 1b and 1a', 1b' are coupled to one another by a respective connecting spring 9 and 9'. Connecting spring 9 and 9' are designed to be flexible along a first axis x and possibly stiff along a second axis y perpendicular to it. Axes x, y form a plane which runs parallel to the plane of a substrate 100 in question, over which the vibrating structure is suspended. Perpendicularly out of the plane of the drawing, that is, as the normal to the substrate surface, the z axis is oriented, about which the rotational rate according to the Coriolis principle is to be detected.

Each of the activating mass elements 1a, 1b, 1a', 1b' has an assigned comb actuator, using which a linear motion along the x axis may be induced. Each respective comb actuator includes fixed electrodes 12a, 12b, 12a', 12b' that are anchored to substrate 100, as well as movable electrodes 13a, 13b, 13a', 13b' which are mounted on the respective activating mass elements 1a, 1b, 1a', 1b'.

The activating mass elements 1a, 1b, 1a', 1b' are anchored to substrate 100 on the side facing away from connecting spring 9 and 9', via anchoring springs 5a, 5b, 5a', 5b'. Reference numeral 18 denotes anchorings for springs 5a, 5b, 5a', 5b'. These anchoring springs 5a, 5b, 5a', 5b' are designed to be flexible along the x axis and possibly stiff along the y axis, in order to avoid a deflection of activating mass elements 1a, 1a', 1b, 1b' along the y axis and to make possible only an approximately one-dimensional motion along the x axis.

Using connecting springs 8a, 8a', the first and second activating mass element 1a and 1a', respectively, are each connected to the external frame-shaped Coriolis mass element 2a at their longitudinal ends. These springs 8a, 8a' are designed in such a manner that they are stiff along the x axis and flexible along the y axis. Accordingly, Coriolis mass element 2a follows the x motion of activating mass elements 1a and 1a'.

In an analogous fashion, the longitudinal ends of activating mass elements 1b, 1b' are connected to the angle continuations of second Coriolis mass element 2b, via connecting springs 8b, 8b'. These connecting springs 8b, 8b' are also designed to be stiff along the x axis and flexible along the y axis. Accordingly, Coriolis mass element 2b follows the x motion of activating mass elements 1b and 1b'.

Consequently, a symmetrical activation of Coriolis mass elements 2a, 2b may be accomplished which, as will be explained below, is expediently designed in such a manner that it brings about vibrations of the Coriolis mass elements 2a, 2b that are in phase opposition.

Detecting mass elements 3a, 3a', 3b, 3b' are explained hereinafter in greater detail. Detecting mass elements 3a, 3a', 3b, 3b' each have a plurality of fingers F which intermesh and which are directed counter to one another with respect to detecting mass elements 3a, 3b and 3a', 3b'. Detecting mass elements 3a, 3b and 3a', 3b' are connected to one another at their middle, in each case via a connecting spring 10 and 10'. Connecting springs 10 and 10' are designed to be flexible along the y axis and possibly stiff along the x axis. The individual fingers F are oriented along the y axis and have movable electrodes 16a, 16b, 16a', 16b' which cooperate with electrodes 14, 14', that are firmly anchored on substrate 100, in order to detect the deflections along the y axis according to the principle of the differential capacitor.

The first and second detecting mass element 3a, 3a' are connected at their longitudinal ends to first Coriolis mass element 2a, via respective connecting springs 7a, 7a'. These springs 7a, 7a' are designed to be flexible along the x axis and stiff along the y axis.

In an analogous manner, third detecting mass element 3b and fourth detecting mass element 3b' are connected to the angle continuations of second Coriolis mass element 2b via connecting springs 7b, 7b'. These connecting springs 7b, 7b' are also designed to be flexible along the x axis and stiff along the y axis. These springs 7a, 7a', 7b, 7b' make it possible for the Coriolis force acting along the y axis on Coriolis mass elements 2a, 2b to be transmitted to detecting mass elements 3a, 3a', 3b, 3b'. Anchoring springs 6a, 6b, 6a', 6b', by which detecting mass elements 3a, 3a', 3b, 3b' are connected to substrate 100, prevent, on the other hand, the activating motion from being transmitted along the x axis to detecting mass elements 3a, 3a', 3b, 3b'. Reference numeral 18 denotes anchorings for springs 6a, 6b, 6a', 6b'.

The present structure has a double decoupling of Coriolis mass elements 2a, 2b, on the one hand, from the activation and, on the other hand from the detection.

In an exemplary embodiment of the present sensor structure, the detection occurs at a structure at rest, which means that the part of the masses, that is, the detecting mass elements, which forms an electrode of the plate capacitor system, substantially carries out no activating motion. The rotational rate sensor described here is a linearly vibrating system in which both the activation and the detection occur in the substrate plane.

As discussed above, the activation of the structure occurs possibly in the antiparallel activating mode, which means that activating mass elements 1a and 1b and 1a' and 1b', and thus also Coriolis mass elements 2a, 2b move in phase opposition. The Coriolis accelerations appearing at an external rotation about the z axis are then also in phase opposition, and if there is an appropriate design of the structures, this leads to an activation of an antiparallel detection mode. In other words, at a certain rotational direction, detecting mass elements 3a and 3a' may be deflected in the positive y direction and 3b and 3b' into the negative y direction.

The desired measuring effect generated thereby may then, by a suitable evaluation, be directly distinguished from an undesired interference effect, brought on by an external linear acceleration in the y direction or a centrifugal acceleration, which would respectively act in phase on the detection mass elements of both partial structures.

Additionally, a rotational acceleration about the sensing axis may not lead to any deflection of the detection elements in the sensing direction.

The Coriolis mass elements may be, but do not have to be, suspended via additional springs at the substrate for the further stabilization.

The activating mass elements may also be connected indirectly via springs between the detection mass elements in such a manner that a mechanical coupling of both partial structures in the activating direction is present, and the formation of parallel and antiparallel vibration modes in the x direction occurs.

The activating mass elements may, on the other hand, also be connected indirectly via springs between the activating mass elements in such a manner that a mechanical coupling of both partial structures in the detecting direction is present, and the formation of parallel and antiparallel vibration modes occurs.

The design of the plate capacitor structures connected to the movable structure may be made with or without a cross bar. A cross bar may be used to avoid comb finger vibrations which may lead to undesired signal fluctuations in the electrical evaluation.

A mechanical coupling in the activating direction and in the detecting direction may also be achieved by suitable coupling spring constructions between the Coriolis mass elements, the coupling spring constructions to be designed flexible in the activating direction and the detecting direction.

The individual masses may possibly be designed as closed frame structures, which may increase stability and may ensure that the frequency of the undesired out-of-plane vibration modes lies in a more favorable range.

In an exemplary embodiment of the masses as open frame structures, possibly a torque adjustment may be achievable by the suitable choice of the spring linking points and also by a suitable design of the frames.

The mass elements may be designed to be perforated (like lattice-work) or not perforated.

What is claimed is:

1. A micromechanical rotational rate sensor, comprising:
   a first Coriolis mass element and a second Coriolis mass element situated over a surface of a substrate;
   an activating device adapted to activate vibrations of the first and the second Coriolis mass elements along a first axis; and
   a detecting device adapted to detect deflections of the first and the second Coriolis elements along a second axis in accordance with a correspondingly acting Coriolis force, wherein the second axis is perpendicular to the first axis, wherein the first and the second axes run parallel to the surface of the substrate, and wherein the detecting device includes a first detection mass device and a second detection mass device; and
   wherein centers of gravity of the first and the second Coriolis mass elements and the first and the second detection mass devices coincide at a common mass center of gravity when the first and the second Coriolis mass elements and the first and the second detection mass devices are at rest.

2. The micromechanical rotational rate sensor of claim 1, wherein:
   the first detection mass device is connected to the first Coriolis mass element via first springs which are flexible along the first axis and stiff along the second axis, the first detection mass device being connected to the substrate via second springs which are stiff along the first axis and flexible along the second axis; and
   the second detection mass device is connected to the second Coriolis mass element via third springs which are flexible along the first axis and stiff along the second axis, the second detection mass device being connected to the substrate via fourth springs which are stiff along the first axis and flexible along the second axis.

3. The micromechanical rotational rate sensor of claim 1, wherein:
   the activating device includes a first activating mass device and a second activating mass device; and
   centers of gravity of the first and the second activating mass devices coincide at the common mass center of gravity when the first and the second activating mass devices are at rest.

4. The micromechanical rotational rate sensor of claim 3, wherein:
   the first activating mass device includes a first activating mass element and a second activating mass element;
   the second activating mass device includes a third activating mass element and a fourth activating mass element; and
   the first, the second, the third, and the fourth activating mass elements are adapted to be individually activated by a respective comb actuator.

5. The micromechanical rotational rate sensor of claim 4, wherein:
   the first and the second activating mass elements are connected to the first Coriolis mass element via fifth springs which are stiff along the first axis and flexible along the second axis, the first and second activating mass elements being connected to the substrate via sixth springs which are flexible along the first axis and stiff along the second axis; and
   the third and the fourth activating mass elements are connected to the second Coriolis mass element via seventh springs which are stiff along the first axis and flexible along the second axis, the third and the fourth activating mass elements being connected to the substrate via eighth springs which are flexible along the first axis and stiff along the second axis.

6. The micromechanical rotational rate sensor of claim 4, wherein:
   the first and the third activating mass elements are coupled to one another by a first connecting spring which is flexible along the first axis; and
   the second and the fourth activating mass elements are coupled to one another by a second connecting spring which is flexible along the first axis.

7. The micromechanical rotational rate sensor of claim 6, wherein the first and the second connecting springs are stiff along the second axis.

8. The micromechanical rotational rate sensor of claim 1, wherein the first Coriolis mass element has a shape of a closed polygonal frame.

9. The micromechanical rotational rate sensor of claim 8, wherein the second Coriolis mass element is situated within the first Coriolis mass element and has a polygonal shape.

10. The micromechanical rotational rate sensor of claim 9, wherein the polygonal shape includes a substantially square shape.

11. The micromechanical rotational rate sensor of claim 8, wherein the closed polygonal frame includes a substantially square frame.

12. The micromechanical rotational rate sensor of claim 1, wherein:
    the first detection mass device includes a first detection mass element and a second detection mass element;
    the second detection mass device includes a third detection mass element and a fourth detection mass element;
    each of the first, the second, the third, and the fourth detection mass elements includes a plurality of fingers situated along the second axis; and
    movable electrodes are provided at the plurality of fingers, the movable electrodes adapted to cooperate with electrodes that are firmly anchored to the substrate to detect the deflections.

13. The micromechanical rotational rate sensor of claim 12, wherein:
the first and the third detection mass elements are coupled to one another by a first respective connecting spring; and
the second and the fourth detection mass elements are coupled to one another by a second respective connecting spring.

14. The micromechanical rotational rate sensor of claim 13, wherein the first and the second respective connecting springs are stiff along the first axis and flexible along the second axis.

15. The micromechanical rotational rate sensor of claim 1, wherein:
a mechanical coupling is provided along the first axis and along the second axis by a coupling spring device between the first and the second Coriolis mass elements, the coupling spring device being flexible along the first axis and along the second axis.

* * * * *